United States Patent
DiGiovanni

[11] Patent Number: 5,937,134
[45] Date of Patent: Aug. 10, 1999

[54] CLADDING PUMPED FIBER LASERS

[75] Inventor: David John DiGiovanni, Montclair, N.J.

[73] Assignee: Lucent Technologies Inc., Murray Hill, N.J.

[21] Appl. No.: 08/908,258

[22] Filed: Aug. 7, 1997

[51] Int. Cl.⁶ .................................................. H01S 3/30
[52] U.S. Cl. .................................................. 385/142; 372/6
[58] Field of Search .................................. 385/141–144; 372/6

[56] References Cited

U.S. PATENT DOCUMENTS

| | | | |
|---|---|---|---|
| 5,027,079 | 6/1991 | Desurvire et al. | 372/6 |
| 5,278,850 | 1/1994 | Ainslie et al. | 372/6 |
| 5,412,672 | 5/1995 | Ainslie et al. | 385/142 |
| 5,731,892 | 3/1998 | DiGiovanni et al. | 372/6 |

*Primary Examiner*—Hung N. Ngo

[57] ABSTRACT

The specification describes fiber laser devices with cores containing aluminum in which the composition of the core is modified to minimize the core $\Delta$, thereby allowing a larger core diameter, and a reduction in the fiber laser length by a factor equal to the square of the diameter difference. This result is achieved by compensation doping the core with phosphorus to offset the index-modifying contribution of aluminum.

8 Claims, 1 Drawing Sheet

CLADDING PUMPED FIBER LASERS

FIELD OF THE INVENTION

This invention relates to fiber laser devices that are laser pumped via a cladding layer.

BACKGROUND OF THE INVENTION

Rare-earth-doped fiber lasers are finding a variety of uses especially in optical communication systems where they can be integrated effectively with fiber links, and active fiber devices such as erbium fiber amplifiers. Fiber lasers are typically laser pumped with inexpensive multi-mode lasers, such as GaAlAs, but have high power, single mode outputs. Fiber laser structures have relatively large active areas so that heating effects, known to be detrimental to the lifetime of other solid state laser structures, are largely absent. See e.g., L. Zenteno, "High-Power Double-Clad Fiber Lasers", *Journal of Lightwave Technology*, Vol. 11, No. 9, pp. 1435–1446, September 1993.

It is known that the power of fiber lasers scales well with cavity length. However, intrinsic losses in the host fiber material also scale with length, and these losses can vary (increase) over time giving unstable system performance. An attractive alternative for increasing power would appear to be to increase the active core area by increasing the core diameter thus increasing the pump absorbing area for a given fiber length. However, for single mode output, this option requires a low core $\Delta$. In a preferred structure, a threshold level of germanium dopant is desired in order to write Bragg gratings in the fiber core and thereby create a laser cavity. It is also known that dopants such as aluminum aid in solubilizing the active rare earth ions. Without an effective amount of Al for this function, the rare earth dopants crystallize, resulting in excessive scattering losses. However, both of these additives increase the core $\Delta$. To keep the overall level of index-modifying dopants low enough to satisfy the low core $\Delta$ requirement mentioned above, the concentration of germanium and aluminum may be too low to meet the above mentioned goals. An approach that would accommodate these conflicting requirements and allow an increase in the active core diameter would represent a significant advance in this technology.

STATEMEMT OF THE INVENTION

A core composition for a fiber laser has been developed which allows a relatively large amount of mixed index-modifying dopants to be incorporated into the core but with a combined effect on the core index that is substantially less than the index-modifying effect of the individual ingredients taken alone. This discovery allows the core diameter of the fiber laser to be increased significantly. The synergistic result is obtained using phosphorus as a counterdopant to offset the index-modifying effect of at least one of the essential ingredients, in this case aluminum.

DETAILED DESCRIPTION

Figure 1:
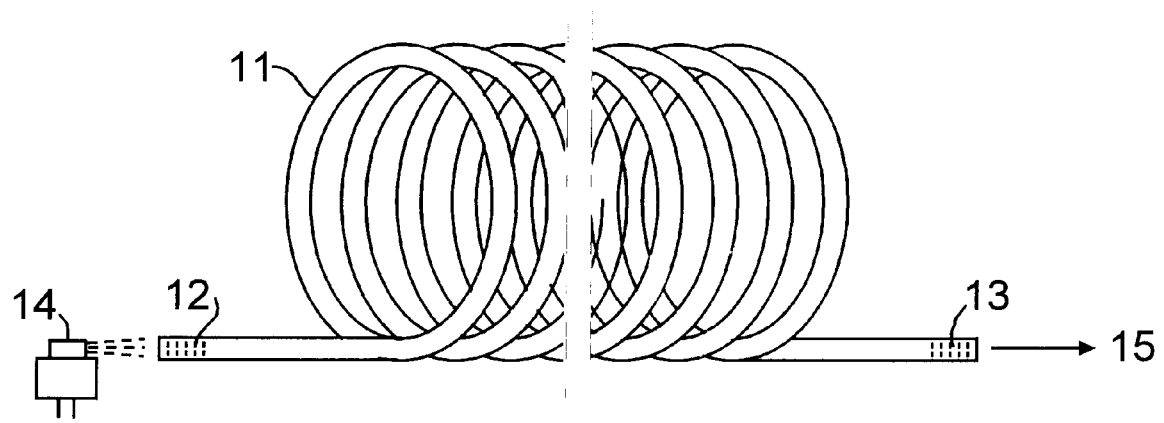
FIG. 1 is a schematic representation of a fiber laser device.

Referring to FIG. 1, a typical fiber laser structure is shown with optical fiber coil 11, with a portion of the coil cut away to depict substantial length. The length of the fiber in these structures is usually of the order of tens of meters, so the fiber in the figure represents many turns. The fiber can be supported on a variety of mandrel structures which may be round or oval. In principal, because it is end-pumped as shown, it can be strung out over its length or substantial portions of its length.

The laser cavity is formed by Bragg reflectors 12 and 13, shown here at the ends of the coiled fiber. These reflectors, or gratings, are typically produced by photoinducing refractive index changes in the core of the optical fiber. Preferably the core is appropriately sensitized with e.g. a hydrogen soak prior to writing the grating. The desired grating pattern is formed by using actinic radiation (typically an excimer laser—pumped frequency doubled dye laser operating near 240 nm) with a varying intensity or periodicity along the length of the fiber. This is conveniently done using a photomask, or by using a patterned light beam produced, e.g., by an interference pattern. The refractive index changes are produced typically by UV induced changes at defect sites of an absorbing ion such as germanium. The germanium doped fiber may be sensitized by hydrogen or deuterium treatments known in the art. Very large (>0.01) refractive index changes can be obtained in such a process. These techniques for forming optical gratings are well known in the art and are described in e.g. U.S. Pat. No. 4,725,110, issued Feb. 16, 1988 and 5,327,515, issued Jul. 5, 1994.

Referring again to FIG. 1, the fiber laser is end pumped by laser diode 14. The output of the fiber laser is indicated at 15. It will be evident to those skilled that the figures in this description are not drawn to scale, and the elements are schematically shown. For example, the laser diode is shown separate from the fiber but those skilled in the art recognize that typically the fiber is attached to the laser with a suitable coupler not shown.

Figure 2:
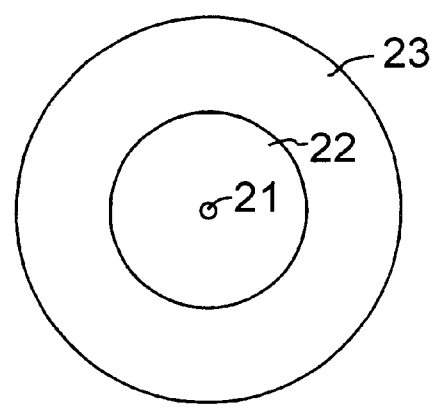
FIG. 2 is an end view of the fiber in the laser device of FIG. 1.

Referring to FIG. 2, an end of the fiber laser is shown. This view is also representative of a cross section taken at any position along the fiber. The fiber laser comprises a core 21, a first cladding 22, and a second cladding 23. The fiber is shown with a circular cross section but may be non-circular, i.e. slightly elliptical, to allow mode coupling. The core of the fiber has a composition in accordance with the invention as will be described below. The first cladding layer is preferably a high silica material, preferably pure $SiO_2$ but at least 85% $SiO_2$. If desired the first cladding layer can include dopants, e.g. germanium, aluminum or phosphorus, to increase the refractive index of the cladding and reduce the $\Delta$ between the cladding and the core. In principle, this eases the constraints discussed earlier, i.e. the core can be more heavily doped while still retaining the overall core/clad guiding characteristics desired. However, it is preferable to reduce the $\Delta$ using the technique of the invention because suitably doped cladding material with sufficient purity is not commercially available.

The second cladding 23 may be any suitable cladding material capable of confining the pump radiation in the first cladding layer, i.e. having a significant $\Delta$ with the first cladding layer. A significant $\Delta$ in this context is >0.03. A preferred second cladding layer is one of many well known polymer coating materials, doped with fluorine to yield the requisite $\Delta$. An advantage of this choice is that the second cladding layer also can also serve as the primary fiber coating. Examples of a suitable materials are UV-curable fluorinated acrylates.

The dimensions of the structure shown in FIG. 2 may vary substantially. The first cladding layer is typically in the range 50–400 μm, and preferably 100–300 μm. The second cladding layer thickness may range from 10 μm to several hundred μm. For light guiding purposes the layer can be relatively thin. If the second cladding layer also serves as the primary or the sole coating, a substantially greater thickness will generally be desired.

The diameter of the core is the focus of the invention. A core size that is commonly used in commercial practice is of the order of 6 μm. For ease and low loss in interconnecting the fiber laser to standard input/output fiber links, or to other fiber devices, it is important that the core diameters closely match. However, in a typical fiber laser with a typical core composition which allows for UV writing of gratings, the core may be substantially smaller than 6 μm. For example, a typical fiber laser core has the following composition (constituents are expressed in terms of optical index):

$Yb_{+3}$: $\Delta n=0.001$

Al: $\Delta n=0.004$

Ge: $\Delta n=0.004$ total: $\Delta n=0.009$

Ytterbium is included at a concentration sufficient to absorb enough pump radiation to provide the desired output power level. This concentration will exhibit about 150 dB/m absorption at 915 nm. Aluminum is included to solubilize the ytterbium. Germanium is included in an amount sufficient to write Bragg gratings.

For single mode operation at 1060 μm, the core size for this fiber laser would have to be 4.7 μm. In a 200 μm overall diameter fiber the length of the fiber laser would be greater than 100 m.

According to the invention, the core of the fiber laser is counterdoped with phosphorus. Phosphorus counteracts the index-modifying effect of aluminum, and consequently can be incorporated in the core at levels sufficient for solubilizing the rare earth ions without substantially increasing the core $\Delta$. The objective in general is to produce a core $\Delta$ of less than 0.007 (based on pure silica as the first cladding material), using the index compensation technique just described. The following core compositions are given by way of example of the invention. In each case the host material is silica, and the core $\Delta$ is calculated based on silica as the first cladding layer.

| constituent | mole % | $\Delta n$ |
|---|---|---|
| $Yb^{+3}$ | 0.5 | .002 |
| Al | 5.7 | .0054 |
| P | 1.4 | .0014 |
| Ge | 0.4 | .0006 |

$\Delta n = .0066$

The net contribution to $\Delta n$ from the combined Al and P constituents is 0.004 since they offset one another. This fiber had a core diameter of 5.0 μm and cutoff wavelength <950 nm. The inner cladding was 200 μm in diameter and showed 0.18 dB/m absorption at 915 nm. The device length was approximately 70 m. These properties are desirable except that the Ge concentration for the device in this example is too low for strong gratings to be written. Increasing the Ge concentration to 1.5% to accommodate written gratings, while keeping other concentrations the same would result in a device length of approximately 110 m.

In the following example the Ge concentration has been increased to allow gratings to be written in the device, and the concentrations of Al and P are balanced to exactly offset their contribution to $\Delta n$.

| constituent | mole % | $\Delta n$ |
|---|---|---|
| $Yb^{+3}$ | 0.5 | .002 |
| Al | 4.3 | .004 |
| P | 4.3 | .004 |
| Ge | 1.5 | .0022 |

$\Delta n = .0042$

The core diameter of this fiber is 6.2 μm and cutoff wavelength <950 nm. The 200 μm cladding has an absorption of 0.28 dB/m, and the device length is approximately 45 m, substantially reduced from the device of Example I. Gratings can easily be written in this fiber. However, it was found that in drawing fibers with this composition the drawing conditions must be carefully controlled to avoid crystallization.

| constituent | mole % | $\Delta n$ |
|---|---|---|
| $Yb^{+3}$ | 0.5 | .002 |
| Al | 5.7 | .0054 |
| P | 8.6 | .0081 |
| Ge | 1.5 | .0022 |

$\Delta n = .0069$

The core diameter in this device was 5.1 μm and cutoff wavelength <950 nm. The 200 μm cladding had an absorption of 0.2 dB/m, and the device length is approximately 66 m. This fiber structure has strong grating writing capabilities, and is easily drawn without crystallization.

The rare earth used in most of these examples, and the preferred rare earth for the invention, is ytterbium, and the output wavelength is 1060 nm. Other rare earths, e.g., Ho, Nd, Er, Tm, Dy, may be substituted in whole or part. The ion concentration will vary depending on the absorption level of the pump radiation used, but is typically 0.1–3.0 mole %, usually 0.1–2.0 mole %. The quantity of aluminum needed to solubilize the rare earth in these compositions is in the range 0.5–8.0 mole %, and the amount of phosphorus added to counteract the index-modifying effect of the aluminum is in the range, 0.5–8.0 mole %. For effective writing of Bragg gratings the amount of germanium required is generally in the range 0.2–3.0%. Fibers with these core dopants are produced following well established methods by mixing the ingredients in the form of their oxides during manufacture of the fiber preform.

In addition to the constraints given above for the ranges of ingredients, the overall index variation, i.e. the core $\Delta$, should be minimized to achieve the goal of the invention. The combined mole % of the dopants should be consistent with producing an overall index difference between the core and the first cladding layer of less than 0.008, and preferably less than 0.0072.

The pump diode used in these demonstrations was a relatively broad band GaAlAs device. However, other semiconductor laser pump sources such as InGaAs or InGaAsP can be substituted. Semiconductor pump lasers are preferred but other pump sources, e.g. Nd-glass, Ti-sapphire, can be used.

The fiber laser devices in these examples had fiber core diameters of approximately 6 μm. Although this is less than 30% larger than the core diameter of the prior art structure described, the difference is more than 60% in terms of the effective area of the core that is exposed to pump radiation. Therefore for a given output power, the length of this fiber laser can be less than half the length of the corresponding prior art fiber laser. Moreover, the flux on the Bragg gratings is reduced by the same area factor, thus reducing the potential for damage of the reflectors during the device lifetime. Using the teachings of the invention it will be routinely possible to produce fiber lasers with cores that essentially match the common fiber core diameters, i.e. 5.5 $\mu$m to 7.5 $\mu$m.

In Example II above the aluminum and phosphorus ingredients were used in equal amounts, i.e. amounts appropriate to largely offset the index-modifying effects of each ion and minimize the core $\Delta$. It was found in the course of this work that when equal molar amounts of Al and P were used, which would appear to be the most effective approach for minimizing core $\Delta$, the rare earth constituent tended to crystallize. Upon further investigation it was determined that solubilization of the rare earth ingredient is more effective if an excess of either aluminum or phosphorus is used. Therefore it will be noticed that in Examples I and III above, the molar amounts of aluminum and phosphorus are not the same. The excess of one over the other should be in the range 5–75% and preferably in the range of 5–50%.

It was also discovered in the course of this work that aluminum is somewhat more effective in solubilizing the rare earth ingredient. Accordingly, the preferred compositions are those which in which the molar quantity of Al present is from 5–75% or preferably 5–50% greater than the amount of P. On the other hand, in applications in which high levels of ionizing radiation and high optical power levels are experienced it may be beneficial to have high phosphorus levels, and a phosphorus rich composition may be desirable.

The fiber laser structures described in this work are dual clad designs which facilitate end or cladding pumping. Single clad structures, which may also be side pumped, are also known in the art and could benefit from the teachings set forth above. The term cladding layer in the context of the invention means a layer that performs some light guiding function. In the dual clad structures described above the second cladding layer also functions as a protective layer, and in performing this function may be referred to as a fiber coating. However, dual cladding fiber laser structures of the kind described above may also have a coating in addition to the second cladding layer.

Various additional modifications of this invention will occur to those skilled in the art. All deviations from the specific teachings of this specification that basically rely on the principles and their equivalents through which the art has been advanced are properly considered within the scope of the invention as described and claimed.

I claim:

1. Fiber laser comprising:

a. a length of glass fiber with a core, a first cladding layer surrounding the core, and a second cladding layer surrounding the first cladding layer, b. reflector means at both ends of said length of glass fiber for defining a laser cavity along the length of glass fiber, c. laser means at one end of said length of glass fiber with the output of the laser aligned to the core of said glass fiber, the invention characterized in that the composition of the core of said glass fiber in mole percent is the following:

0.1–2.0 rare earth 0.2–3.0 Ge 0.5–8.0 Al 0.5–8.0 P remainder $SiO_2$, the invention further characterized in that the difference between the refractive index of the core and the refractive index of the first cladding layer is less than 0.008.

2. The fiber laser of claim 1 in which the first cladding layer consists essentially of at least 85% $SiO_2$.

3. The fiber laser of claim 1 in which the mole % of Al is greater than the mole % of P by 5–75%.

4. The fiber laser of claim 1 in which the mole % of P is greater than the mole % of Al by 5–75%.

5. The fiber laser of claim 1 in which the diameter of the core is greater than 5.5 $\mu$m.

6. The fiber laser of claim 1 in which the rare earth is selected from the group consisting of Tb, Nd, Ho, Dy, Tm, Er.

7. The fiber laser of claim 5 in which the rare earth is Yb.

8. The fiber laser of claim 1 in which the difference between the refractive index of the core and the refractive index of the first cladding layer is less than 0.0072.

* * * * *